(12) United States Patent
Aoyama

(10) Patent No.: US 8,233,079 B2
(45) Date of Patent: Jul. 31, 2012

(54) ENVIRONMENT RECOGNITION METHOD AND APPARATUS FOR A THREE-DIMENSIONAL VISION SENSOR

(75) Inventor: Chiaki Aoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 430 days.

(21) Appl. No.: 12/526,804

(22) PCT Filed: Jan. 15, 2008

(86) PCT No.: PCT/JP2008/050334
§ 371 (c)(1),
(2), (4) Date: Aug. 12, 2009

(87) PCT Pub. No.: WO2008/099629
PCT Pub. Date: Aug. 21, 2008

(65) Prior Publication Data
US 2010/0110280 A1    May 6, 2010

(51) Int. Cl.
*H04N 5/222* (2006.01)
*H04N 7/18* (2006.01)
(52) U.S. Cl. ...... 348/370; 348/135; 348/139; 348/222.1
(58) Field of Classification Search .......... 348/135, 348/142
See application file for complete search history.

(56) References Cited

U.S. PATENT DOCUMENTS

| | | | |
|---|---|---|---|
| 5,699,151 A | 12/1997 | Akasu | |
| 6,654,482 B1 * | 11/2003 | Parent et al. | 382/104 |
| 7,774,100 B2 * | 8/2010 | Aoyama | 700/259 |
| 7,786,678 B2 * | 8/2010 | Kurt et al. | 315/158 |
| 2002/0006282 A1 * | 1/2002 | Ushiro et al. | 396/429 |
| 2006/0170586 A1 | 8/2006 | Honya et al. | |

FOREIGN PATENT DOCUMENTS

| | | |
|---|---|---|
| DE | 197 30 414 A1 | 1/1999 |
| EP | 1 464 983 A1 | 10/2004 |
| JP | 59-197810 A | 11/1984 |
| JP | 61-149879 | 7/1986 |
| JP | 10-268067 | 10/1998 |
| JP | 2002-156226 A | 5/2002 |
| JP | 2004-220612 A | 8/2004 |
| JP | 2005-121398 | 5/2005 |
| JP | 2006-118924 | 5/2006 |
| WO | 2006054230 A1 | 5/2006 |
| WO | WO 2006054230 A1 * | 5/2006 |

OTHER PUBLICATIONS

European Search Report EP08703198 dated Feb. 18, 2010.
Japanese Office Action application No. JP2007-034773 dated Jul. 26, 2011.

\* cited by examiner

*Primary Examiner* — Ngoc-Yen Vu
(74) *Attorney, Agent, or Firm* — Squire Sanders (US) LLP

(57) ABSTRACT

In an environment recognition apparatus including a light projector that intermittently projects a light pattern toward an object to be measured existing in an environmental space in accordance with a duty factor of a pulse train defining one frame, a camera that outputs a difference image between an image of the object taken at an exposure where the light pattern is projected and an image of the object taken at an exposure where the light pattern is not projected and the object is recognized based on the difference image, there is equipped with a timing controller that controls the projection timing by varying a pulse repetition period in the pulse train in one frame at random, thereby effectively avoiding the interference with the other while using a camera of ordinary sensitivity.

8 Claims, 8 Drawing Sheets

ENVIRONMENT RECOGNITION METHOD AND APPARATUS FOR A THREE-DIMENSIONAL VISION SENSOR

TECHNICAL FIELD

This invention relates to an environment recognition apparatus and method thereof, particularly to an environment recognition apparatus comprising a three-dimensional vision sensor in the active sensor type, which projects a light pattern toward an object to be measured and receives a light signal returned therefrom to recognize a shape, etc., of the object.

BACKGROUND ART

As an example of an environment recognition apparatus comprising a three-dimensional vision sensor in the active sensor type, a technique mentioned in Patent Document Reference 1 can be cited. The apparatus mentioned in Reference 1 is mounted on an autonomous mobile robot and utilizes the light-section method. In the apparatus, a particular point is set on an object (to be measured) by projecting a slit light (a light pattern) on the object and by taking an image by a photographing device, and the distance to the point is measured based on the positional relationship between the slit light projecting position and the photographing device.

Specifically, the apparatus is configured such that, the timing of projecting the slit light (that is determined by a duty factor in a pulse train) is varied at random to avoid interference of the sensors mounted on the other mobile robots even in a narrow environmental space where the robots exist. More specifically, pulse rise time (leading edge) in the pulse train whose pulse repetition period T is made constant, is varied at random within a range of the period T, thereby enabling to avoid the interference with the others.

In this kind of sensors, as mentioned in Patent Document Reference 2, the influence of reflection on the object such as caused by an illuminating light unintentionally taken in the image, is reduced by obtaining a difference image between an image taken when the light is projected and an image taken when the light is not projected.

Patent Document Reference 1: Japanese Laid-Open Patent Application No. 2002-156226
Patent Document Reference 2: Japanese Laid-Open Patent Application No. 2001-337166

DISCLOSURE OF THE INVENTION

Problems to be Solved by the Invention

In the prior art mentioned above, the pulse rise time in the period T is varied at random. As a result, the camera must have a high sensitivity, since there may be a case in which the pulse width becomes small and hence the light projecting time period becomes short.

The object of this invention is to overcome the drawback in the prior art and to provide an environment recognition apparatus and method thereof that can effectively avoid the interference with the other while using a camera of ordinary sensitivity.

Means for Solving the Problem

In order to achieve the object, as recited in claim 1 mentioned below, this invention is configured to have an environment recognition apparatus including: a light projector that intermittently projects a light pattern toward an object to be measured existing in an environmental space in accordance with a duty factor of a pulse train defining one frame; a camera that outputs a difference image between an image of the object taken at an exposure where the light pattern is projected and an image of the object taken at an exposure where the light pattern is not projected; and a recognition means that recognizes the object based on the outputted difference image; characterized by: a timing controller that controls a timing to project the light pattern by varying a pulse repetition period in the pulse train in one frame at random.

Further, as recited in claim 2 mentioned below, this invention is configured such that the light pattern is a texture light pattern.

Further, as recited in claim 3 mentioned below, this invention is configured such that the apparatus is mounted on a moving object that is configured to be movable using moving means.

Further, as recited in claim 4 mentioned below, this invention is configured to have an environment recognition method including the steps of: intermittently projecting a light pattern toward an object to be measured existing in an environmental space in accordance with a duty factor of a pulse train defining one frame; obtaining a difference image between an image of the object taken at an exposure where the light pattern is projected and an image of the object taken at an exposure where the light pattern is not projected; and recognizing the object based on the obtained difference image; characterized by the step of: controlling a timing to project the light pattern by varying a pulse repetition period in the pulse train in one frame at random.

Further, as recited in claim 5 mentioned below, this invention is configured such that the light pattern is a texture light pattern.

Effects of the Invention

In claim 1, since it is configured such that the environment recognition apparatus includes: a light projector that intermittently projects a light pattern toward an object to be measured existing in an environmental space in accordance with a duty factor of a pulse train defining one frame; a camera that outputs a difference image between an image of the object taken at an exposure where the light pattern is projected and an image of the object taken at an exposure where the light pattern is not projected; and a recognition means that recognizes the object based on the outputted difference image; and is characterized by: a timing controller that controls a timing to project the light pattern by varying a pulse repetition period in the pulse train in one frame at random, by varying the projection timing of the light pattern at random, like the prior art, the pulse can be out of phase with that of the other apparatus, thereby enabling to avoid the interference therewith effectively.

Further, since what is varied at random is the pulse repetition period, it becomes possible to prevent the pulse width from becoming small and the projection time from falling short and hence, the camera need not have a high sensitivity. In addition, since it is configured to obtain the difference image between the images taken at the exposure when the light pattern is projected and the exposure when the light pattern is not projected, it becomes possible, like the prior art, to reduce the influence of reflection on the object to be measured caused, for example, by the fact that an illuminating light is unintentionally taken in the image.

Further, in claim 2, since it is configured such that the light pattern is a texture light pattern, in addition to the effects mentioned in claim 1, it becomes possible to associate the images when a plurality of cameras are used even if the object has no pattern and to enhance the recognition accuracy.

Further, in claim 3, since it is configured such that the apparatus is mounted on a moving object that is configured to be movable using moving means, in addition to the effects mentioned above, it becomes possible to accurately recognize the environmental space where it exists.

In claim 4, since it is configured such that the environment recognition method includes the steps of: intermittently projecting a light pattern toward an object to be measured existing in an environmental space in accordance with a duty factor of a pulse train defining one frame; obtaining a difference image between an image of the object taken at an exposure where the light pattern is projected and an image of the object taken at an exposure where the light pattern is not projected; and recognizing the object based on the obtained difference image; and is characterized by the step of: controlling a timing to project the light pattern by varying a pulse repetition period in the pulse train in one frame at random, by varying the projection timing of the light pattern at random, like the prior art, the pulse can be out of phase with that of the other environment recognition apparatus mounted on the other legged mobile robot, thereby enabling to avoid the interference therewith. And since what is varied at random is the pulse repetition period, it becomes possible to prevent the pulse width from becoming small and the projection time from falling short and hence, the camera need not have a high sensitivity.

Further, since it is configured to obtain the difference image between the images taken at the exposure when the light pattern is projected and the exposure when the light pattern is not projected, it becomes possible, like the prior art, to reduce the influence of reflection on the object to be measured caused, for example, by the fact that an illuminating light is unintentionally taken in the image In claim 5, since it is configured such that the light pattern is a texture light pattern, in addition to the effects mentioned in claim 4, it becomes possible to associate the images when a plurality of cameras are used even if the object has no pattern and to enhance the recognition accuracy.

BEST MODE OF CARRYING OUT THE INVENTION

The best mode for carrying out an environment recognition apparatus and method thereof according to this invention will be explained with reference to the attached drawings in the following.

First Embodiment

Figure 1:
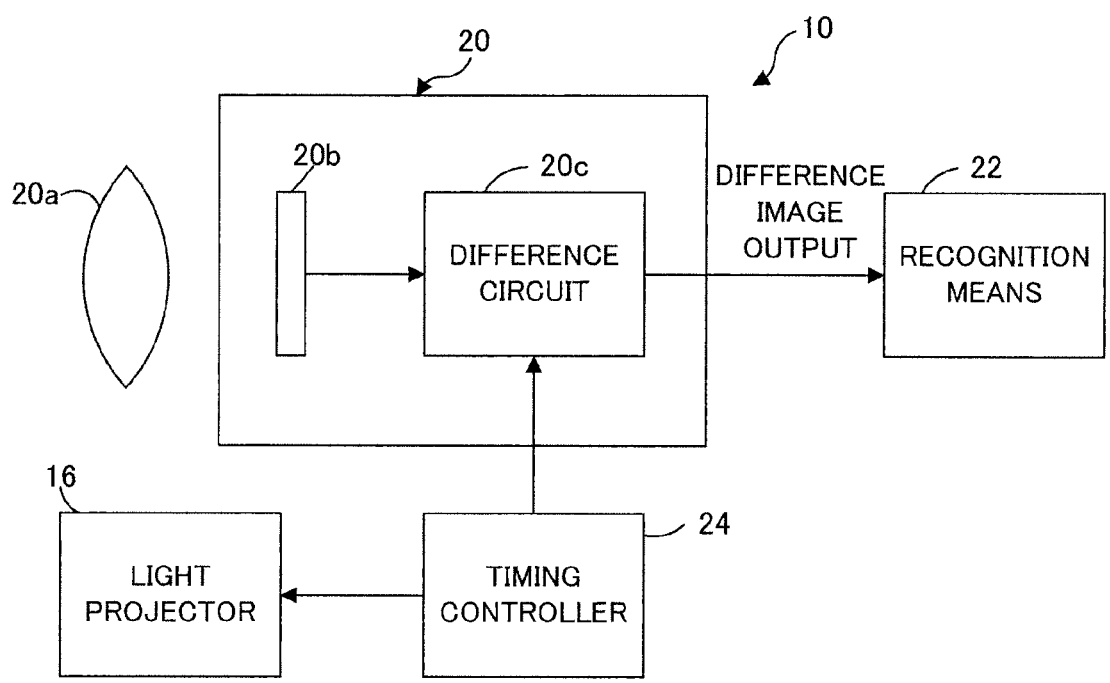
FIG. 1 is a block diagram schematically showing an environment recognition apparatus according to a first embodiment of this invention.
Figure 2:
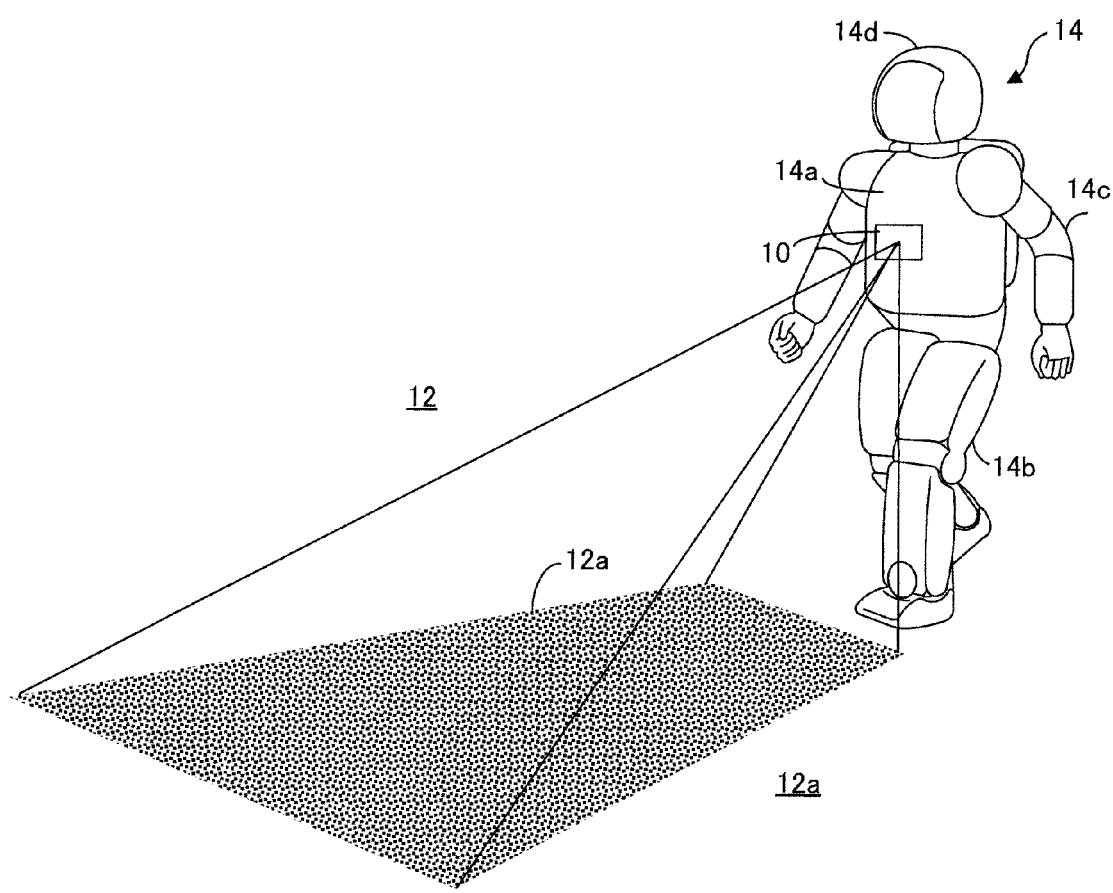
FIG. 2 is a perspective view showing a legged mobile robot on which the environment recognition apparatus illustrated in FIG. 1 is mounted.

FIG. 1 is a block diagram schematically showing an environment recognition apparatus and method thereof according to a first embodiment of this invention, and FIG. 2 is a perspective view showing a legged mobile robot on which the apparatus is mounted.

Explaining them with reference to the figures, reference numeral 10 in FIG. 1 designates an environment recognition apparatus. As shown in FIG. 2, the environment recognition apparatus 10 is mounted on a body 14a of a legged mobile robot 14 of biped locomotion that is configured to move over an appropriate environmental space 12 such as a company premise.

The environmental recognition apparatus 10 comprises a light projector 16 that projects or emits a light pattern 16a toward an object to be measured like a floor surface existing in the environmental space 12 as shown in FIG. 2, a camera 20 that outputs a difference image between an image of the object 12a taken (photographed) at an exposure where the light pattern 16a is projected (emitted) and an image of the object 12a taken at an exposure where the light pattern 16a is not projected, a recognition means 22 that recognizes a shape, undulation, distance, etc., of the object 12a based on the difference image outputted from the camera 20, and a timing controller 24 that controls the timing at which the light pattern 16a is projected. The environment recognition apparatus 10 is constituted as a three-dimensional vision sensor of the active sensor type.

Figure 3:
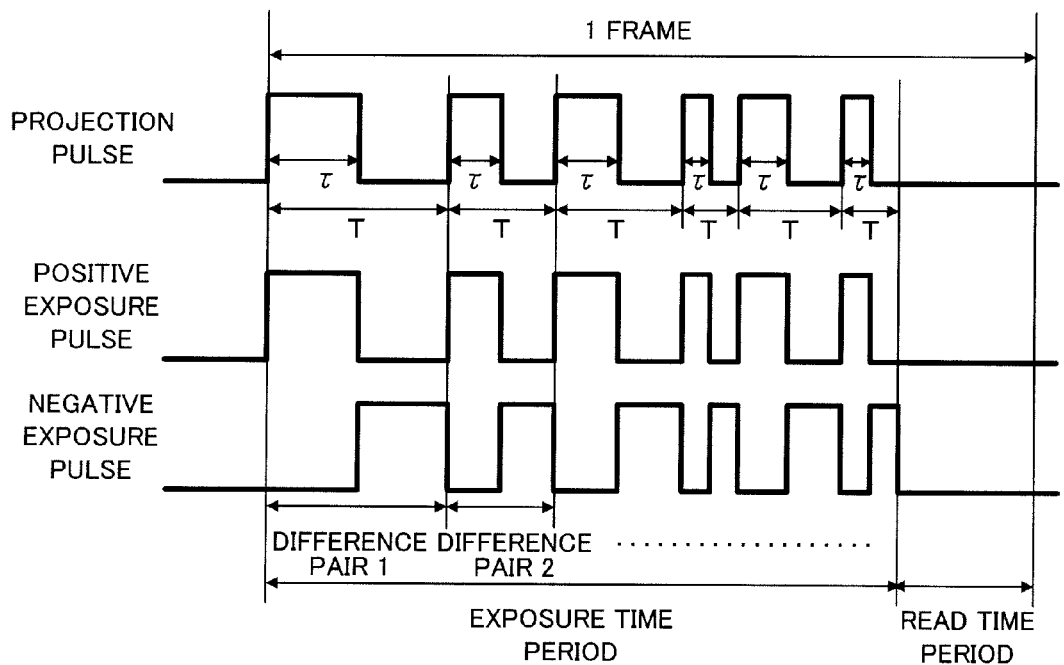
FIG. 3 is a time chart showing the timing of projection and exposure of a light pattern, etc., of the environment recognition apparatus illustrated in FIG. 1.

Explaining them in detail, the light projector 16 comprises a laser scanner, a diffraction grating and lens and intermittently projects or emits a light pattern 16a comprising a laser light in accordance with a duty factor in a pulse train defining one frame as shown in FIG. 3. The one frame indicates a time period in which one image is to be outputted and is a fixed time period such as 10 milliseconds. In the specification, "light pattern" is used to include a light pattern of unpatterned one.

FIG. 3 is a time chart showing the timing of projection and exposure of the light pattern 16a, etc., in pulse trains. In FIG. 3, the top pulse train indicates projection pulses, the second pulse train that has the same phase with the top pulse train indicates positive exposure pulses, and the bottom pulse train that has the reverse phase with the top and second pulse trains indicates negative exposure pulses. In the pulses, T: pulse repetition period, τ: pulse width and τ/T: the duty factor. In the embodiment, the duty factor is set to 50%.

Thus, by making the positive exposure time period and the negative exposure time period equal, any component resulted by the projection of an uneventful light during the time period becomes plus/minus zero and advantageously, is not affected.

The duty factor is not necessarily 50%. It suffices if the sum of positive and negative exposure time periods are made equal.

The characteristic feature of this embodiment is that the pulse repetition period T is varied at random, which will be mentioned later. Here, "random" is used to mean not only the case in which homogeneous random numbers are used, but also the case in which pseudorandom numbers are used.

The light projector 16 projects, at the instruction of the timing controller 24, the light pattern 16a intermittently in accordance with the duty factor. More specifically, it starts the projection at the projection pulse rise time (leading edge), continues the projection until the projection pulse falls and terminates the projection at the pulse fall time (trailing edge). In other words, the light projector 16 starts lights-out at projection pulse fall time, continues the lights-out unless the projection pulse rises and terminates lights-out at the pulse rise time.

The camera 20 comprises a CCD camera and includes lens 20a that passes a light such as an illuminating light or projected light, a light exposure unit 20b that exposes to the light from the lens 20a to form an image, and a difference circuit 20c that inputs the output of the light exposure unit 20b. The light exposure unit 20b has 512×512 numbers of pixels and the light passing the lens 20a forms an image on the pixels.

Figure 4:
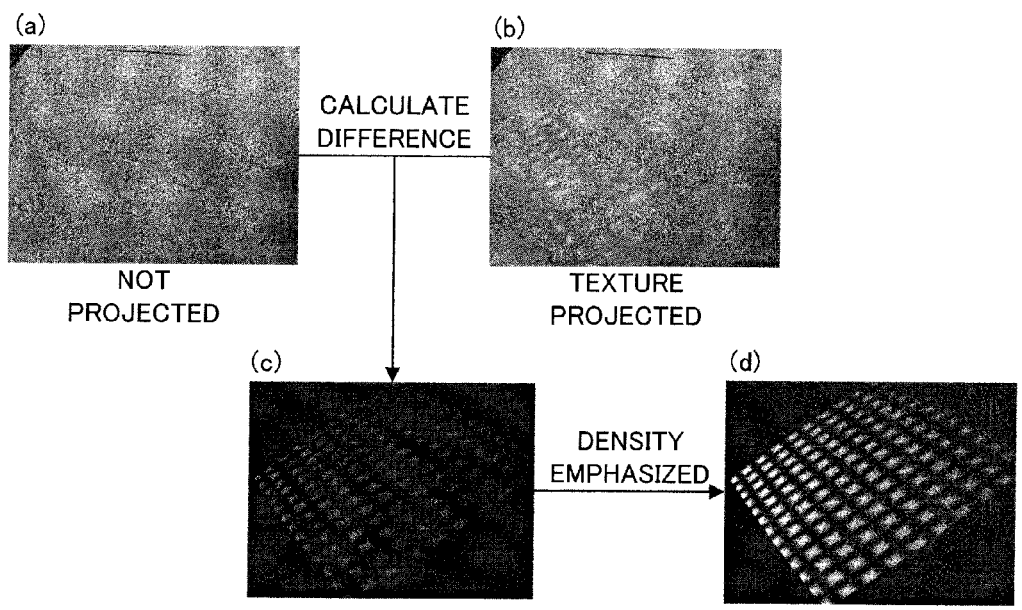
FIG. 4 is an explanatory view showing a difference image between images when the light pattern of the environment recognition apparatus illustrated in FIG. 1 is projected/not projected.

As shown in FIG. 4, the camera 20 takes an image (FIG. 4(b)) of the object 12a at the exposure when the light pattern 16a is projected, i.e., with the light pattern 16a and the illuminating light or available (natural) light (hereinafter referred to as "positive exposure"), takes an image (FIG. 4(a)) of the object 12a at the exposure when the light pattern 16a is not projected, i.e., only with the illuminating light or available light (hereinafter referred to as "negative exposure"), and outputs a difference image (FIG. 4(c)) therebetween. FIG. 4(d) shows an image in which the contrasting density of the difference image is emphasized.

To be specific, since the object (floor surface) 12a in this embodiment can reflect a light, ceiling lamps can be unintentionally taken in the image as shown in FIG. 4(a). For that reason, the difference image is obtained to reduce the influence of reflection. And, since the object (floor surface) 12a is unpatterned, the light pattern 16a to be projected is set as a texture (pattern) light pattern as shown in FIG. 4(b). This follows: background+pattern (FIG. 4(b))−background (FIG. 4(a))=pattern (FIG. 4(d)). With this, it becomes possible to reduce the influence of unintentionally taken image or disturbance light, and to associate the images each other even when the object 12a has no pattern. In FIG. 2, the light pattern 16a of FIG. 4 is schematically illustrated.

In FIG. 1, the difference image outputted from the difference circuit 20c of the camera 20 is sent to the recognition means 22. The recognition means 22 comprises a microcomputer and recognizes the shape and undulation, etc., of the object (floor surface) 12a based on the difference image shown in FIG. 4 (c) or 4(d). Since the processing of the recognition means 22 is not the gist of this invention, further explanation will be omitted.

Figure 5:
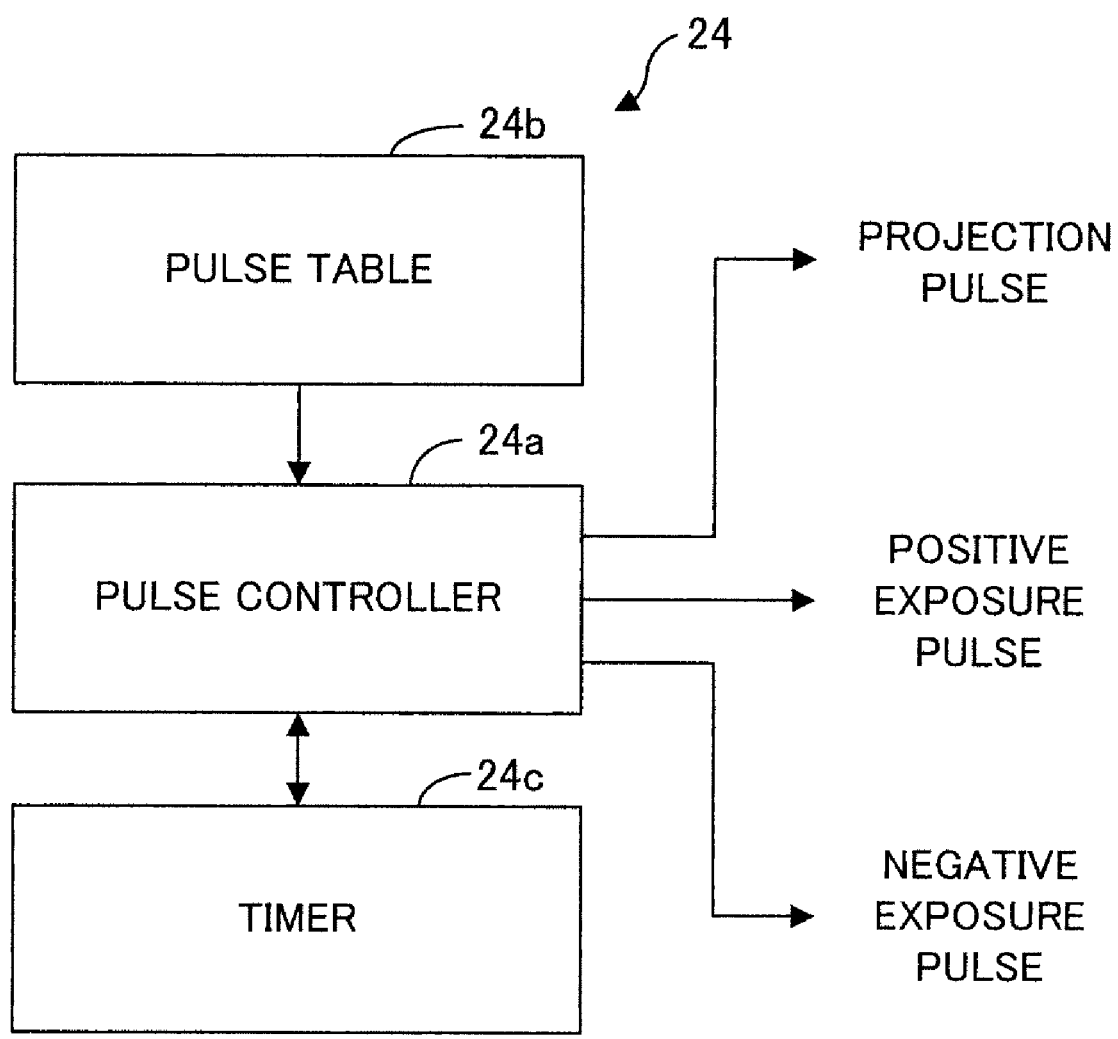
FIG. 5 is a block diagram showing the configuration of a timing controller illustrated in FIG. 1.

As shown in FIG. 5, the timing controller 24 has a pulse controller 24a, a pulse table 24b and a timer 24c. Also the pulse controller 24a comprises a microcomputer and by referring to the timer 24c, it outputs the projection pulses, positive exposure pulses and negative exposure pulses (illustrated in FIG. 3) in accordance with pulse data stored in the pulse table 24b. This will be described later.

The calculation of the difference image will be explained with reference to FIG. 3. The light pattern 16a is projected from the light projector 16 in accordance with the duty factor of the pulse train defining the one frame, more specifically when the projection pulse rises to 1.

The difference circuit 20c integrates the density or brightness at each pixel of image taken with positive exposure each time the positive exposure pulse becomes 1 in the exposure time period shown in FIG. 3, while integrating the density or brightness at each pixel of image taken with negative exposure each time the negative exposure pulse becomes 1, and then calculates the difference therebetween as difference pair 1, difference pair 2, . . . By repeating this processing, the circuit 20c integrates the values of difference pairs and after the exposure time period has elapsed and the exposure is all terminated, it outputs a final difference value at the read time period shown in FIG. 3. The difference pairs may instead be calculated in a lump at the read time period.

The legged mobile robot (moving object) 14 shown in FIG. 2 is equipped with the body 14a, two legs (moving means) 14b connected to the body 14a through joints, two arms 14c connected to the body 14a through joints and a head 14d connected at the top of the body 14a, etc. The environment recognition apparatus 10 is mounted on the body 14a or thereabout of the moving object (legged mobile robot) 14 that is movable with the use of moving means (legs) 14b. Since the details of the legged mobile robot 14 is described in Japanese Laid-Open Patent Application No. 2006-82201, no further explanation will be made.

The operation of the pulse controller 24a of the timing controller 24 will be explained with reference to the drawing.

Figure 6:
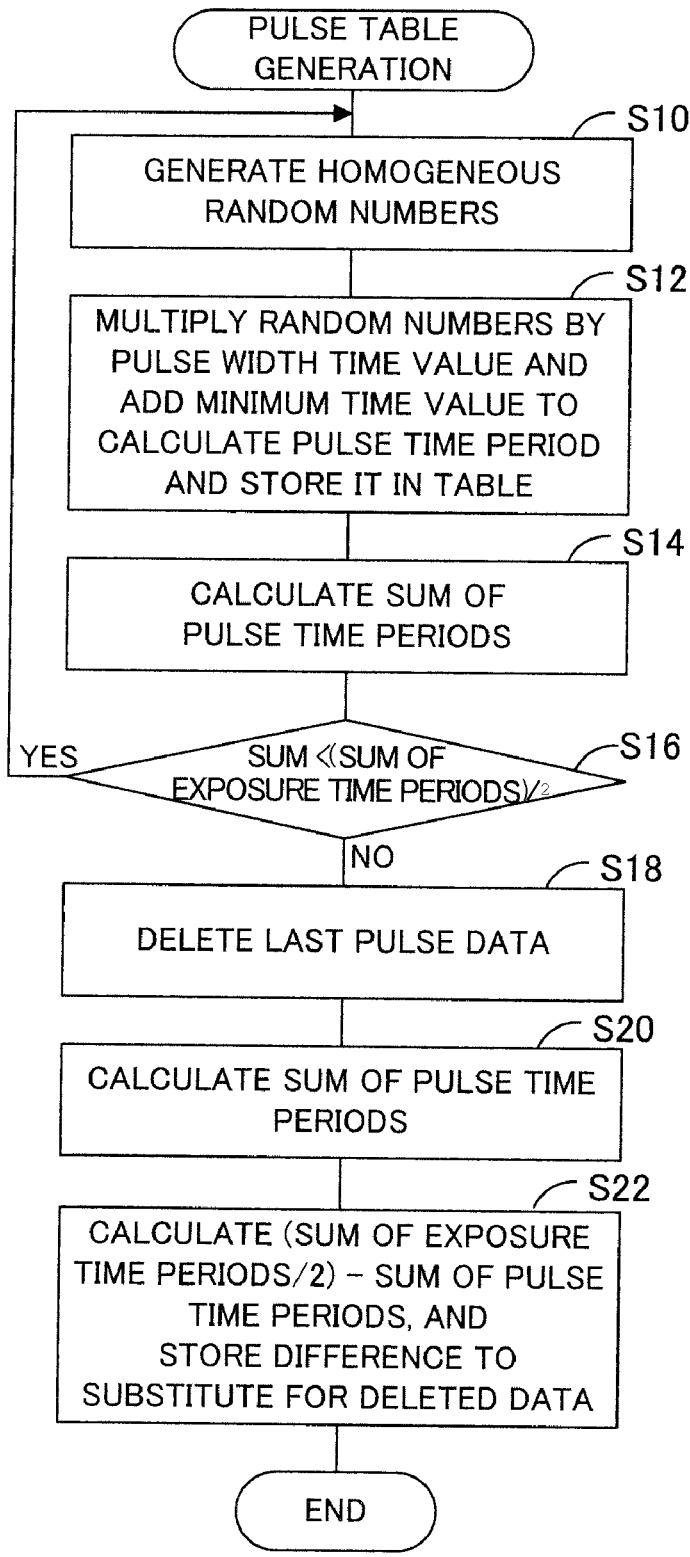
FIG. 6 is a flowchart showing the operation of the timing controller illustrated in FIG. 5.

FIG. 6 is a flowchart showing generation of the data of the projection pulses stored in the pulse table 24b. The projection pulses and positive exposure pulses are in the same phase and the negative exposure pulses are the same if the phase is made reverse, the processing is also applicable to the generation of the data of positive and negative exposure pulses.

Explaining this, in S10 in which homogenous random numbers are generated between 0 and 1, for example as 0.3, 0.9, 0.8, . . . The program proceeds to S12 in which each of the generated random numbers is multiplied by a time value corresponding to the pulse width τ, and the obtained product is then added by a predetermined time value corresponding to a minimum pulse width to obtain a pulse time period (pulse repetition period). The calculated pulse time period is successively stored in the pulse table 24b. For example, when the pulse width τ is 20 microseconds to 30 microseconds, the pulse time period is random number x 10+20 microseconds.

The program then proceeds to S14 in which a sum of the calculated pulse periods is calculated, and to S16 in which it is determined whether the sum is less than ½ of a sum of the exposure time periods. Explaining this by the example shown in FIG. 3, six projection pulses each indicating exposure time period are generated in one frame and all of the pulses have the 50% duty factor. Accordingly, the determination of S16 amounts to judging whether the processing has not been finished for the six pulses.

When the result is affirmative in S16, the program proceeds back to S10 and the above processing is repeated. On the contrary, when the result is negative, the program proceeds to S18 in which the last pulse data is deleted, and to S20 in which the sum of the pulse time periods is again calculated.

The program then proceeds to S22 in which the re-calculated sum of the pulse time periods is subtracted from (the sum of exposure time periods/2) to calculate a difference and substitute it with the deleted last pulse data (last pulse time period). By this, it becomes possible to obtain the pulse repetition periods T (in the pulse train defining one frame) that are varied at random, without determining strictly if the sum is equal to ½ of the sum of exposure time periods.

Figure 7:
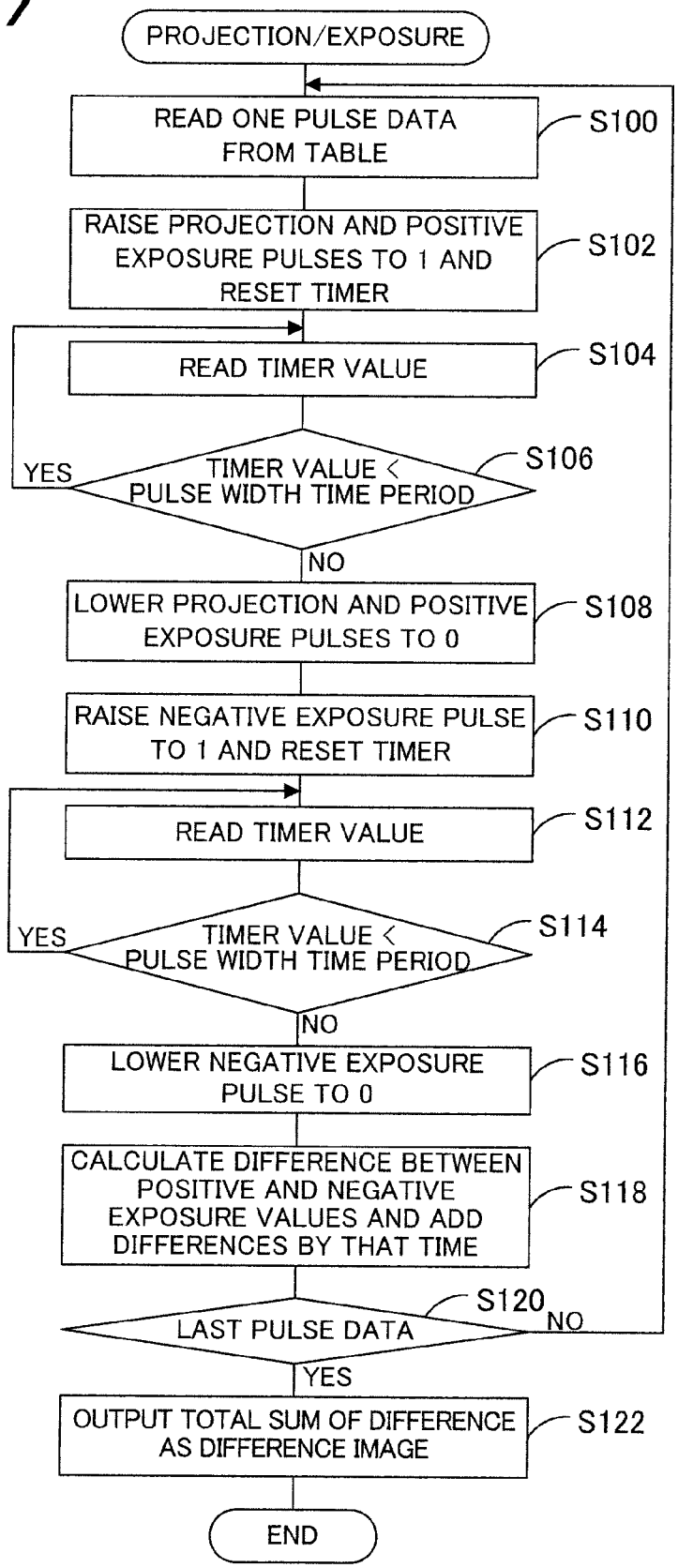
FIG. 7 is a flowchart similarly showing the operation of the timing controller illustrated in FIG. 5.

FIG. 7 is a flowchart showing projection and exposure implemented by the pulse controller 24a of the timing controller 24 using the table data obtained by the processing of FIG. 6 flowchart.

Explaining this, in S100, data for one pulse is read from the pulse table 24b and the program proceeds to S102 in which the projection pulse and positive exposure pulse are raised to 1 and the timer 24c is reset (started).

The program then proceeds to S104 in which the timer value is read, to S106 in which it is determined whether the timer value is less than a pulse time (time period of pulse width τ) of the projection pulse and positive exposure pulse of the pulse data read in S100. Insofar as the result is affirmative in S106, the program proceeds back to S104 to repeat the above-mentioned processing. Meanwhile, the light projector 16 continues to project the light pattern 16a and the integral at the positive exposure is calculated in the camera 20.

On the other hand, when the result in S106 is negative, the program proceeds to S108 in which the projection pulse and positive exposure pulse are lowered to 0. The program next proceeds to S110 in which the negative exposure pulse is raised to 1 and the timer 24c is reset (started), to S112 in which the timer value is read, and to S114 in which it is determined whether the timer value is less than the pulse time (time period of pulse width τ) of the negative exposure pulse of the pulse data read in S100.

Insofar as the result is affirmative in S114, the program proceeds back to S112 to repeat the above-mentioned processing. Meanwhile, the light projector 16 continues to terminate the projection of the light pattern 16a and the integral at the negative exposure is calculated in the camera 20. On the other hand, when the result in S114 is negative, the program proceeds to S116 in which the negative exposure pulse are lowered to 0.

The program then proceeds to S118 in which the difference between the positive exposure value and negative exposure value is calculated in the difference circuit 24c and is added to the differences by that time, i.e., the pixel values at the positive and negative exposure are respectively added. The program next proceeds to S120 in which it is determined whether the data is the last pulse data and when the result is negative, the program proceeds back to repeat the above-mentioned processing, while when the result is affirmative, the program proceeds to S122 in which the total sum of the difference is outputted as the difference image from the difference circuit 24c.

The environment recognition apparatus 10 according to the first embodiment of this invention is configured to have the timing controller 24 (more specifically the pulse controller 24a) that controls the timing to project the light pattern 16a by varying the pulse repetition period T of the pulse train in the one frame at random. Thus, by varying the projection timing of the light pattern 16a at random, like the prior art, the pulse can be out of phase with that of the other environment recognition apparatus 10 mounted on the other legged mobile robot 14, thereby enabling to avoid the interference therewith effectively. Further, since what is varied at random is the pulse repetition period T, it becomes possible to prevent the pulse width from becoming small and the projection time from falling short and hence, the camera 20 need not have a high sensitivity.

Figure 8:
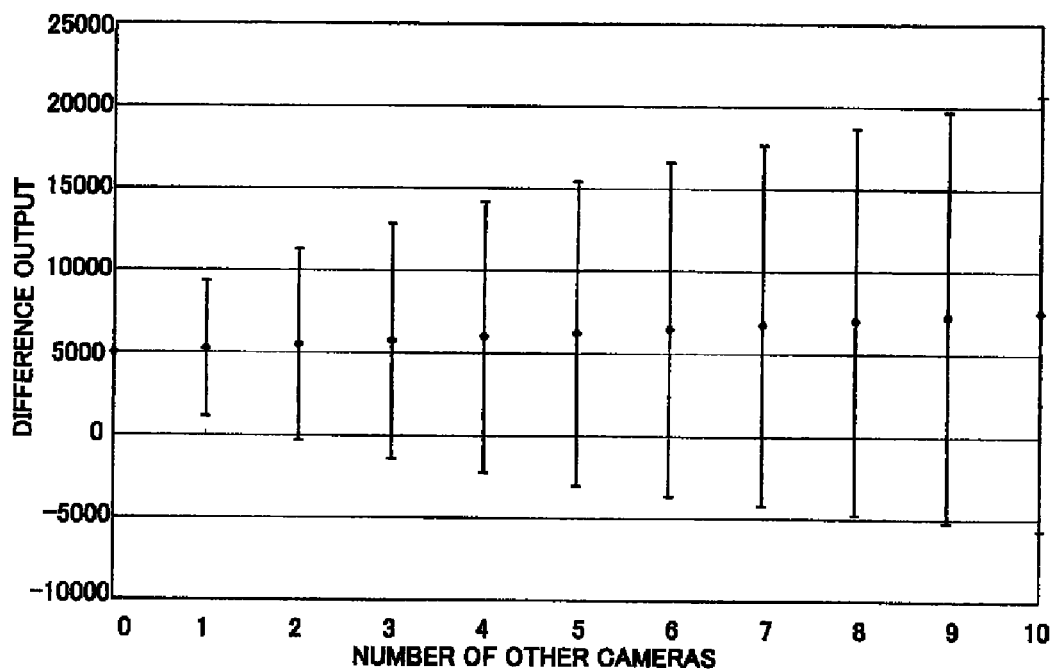
FIG. 8 is a graph showing an example of difference outputs when the interference with the other is not avoided.
Figure 9:
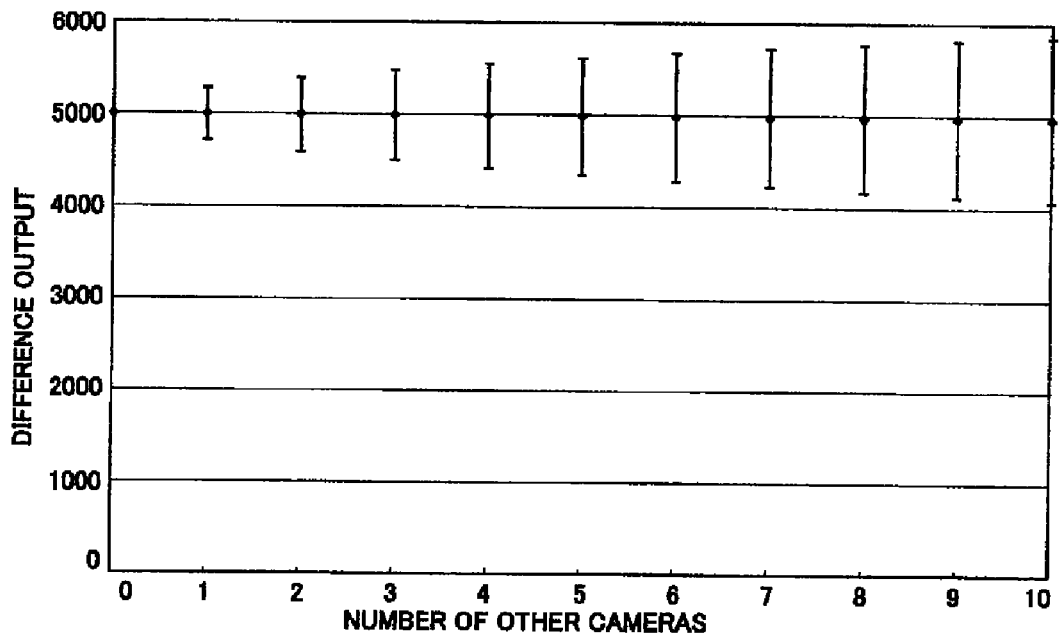
FIG. 9 is a graph showing an example of the difference outputs when the interference is avoided according to the first embodiment.

FIG. 8 is a graph showing an example of the difference outputs when the interference with the other is not avoided and FIG. 9 is a graph showing an example of the difference outputs when the interference is avoided according to the first embodiment.

In FIG. 8, the average of the difference outputs and their variance (error) when each of the positive and negative exposure time is 10 microseconds in one frame (10 milliseconds) are plotted for different number of cameras. The difference output will be ideal if it is 5000 or thereabout, no matter how many cameras are. When the interference is not avoided, the bar indicative of the limit of error is at a range of 2σ. This means that it will be buried in noise if even only one number of other camera exists.

In FIG. 9, the average of the difference outputs and their variance (error) when each of the positive and negative exposure time is 10 microseconds to 20 microseconds in one frame (10 milliseconds) are plotted for different number of cameras. As will be clear from FIG. 9, the noise is reduced to ⅕ although other ten cameras exist.

In addition, since it is configured to obtain the difference image between the images taken at the exposure when the light pattern is projected and the exposure when the light pattern is not projected as shown in FIG. 3, it becomes possible, like the prior art, to reduce the influence of reflection on the object to be measured caused, for example, by the fact that an illuminating light is unintentionally taken in the image.

In addition, since the environment recognition apparatus 10 is configured to be mounted at the body 14a or thereabout of the moving object (legged mobile robot) 14 that is configured to movable with the use of moving means (legs 14b), in addition to the effects and advantages mentioned above, it becomes possible to accurately recognize the environmental space 12 where the legged mobile robot 14 is present.

Second Embodiment

Figure 10:
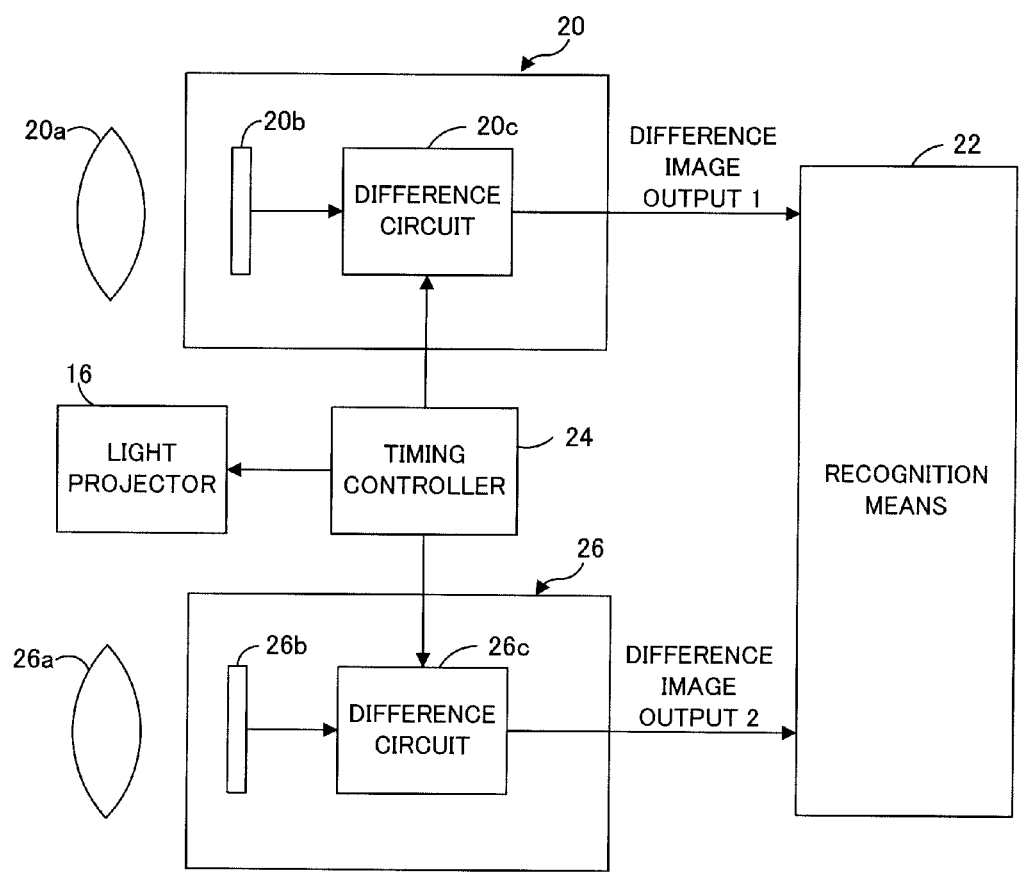
FIG. 10 is a block diagram, similar to FIG. 1, but schematically showing an environment recognition apparatus according to a second embodiment of this invention.

FIG. 10 is a block diagram, similar to FIG. 1, but schematically showing an environment recognition apparatus according to a second embodiment of this invention.

Explaining this with focus on the differences from the first embodiment, in the environmental recognition apparatus 10 according to the second embodiment, in addition to the light projector 16 that projects or emits a light pattern 16a toward the object 12a to be measured, the camera 20 that outputs the difference image between the images of the object 12a taken at the exposure where the light pattern 16a is projected and taken at the exposure where the light pattern 16a is not projected, the recognition means 22 that recognizes a shape, undulation, etc., of the object 12a based on the difference image outputted from the camera 20, and the timing controller 24 that controls the timing of projecting the light pattern 16a, it comprises a second camera 26.

Like the camera 20, the second camera 26 comprises a lens 26a, a light exposure unit 26b and a difference circuit 26c, and outputs the difference image from the difference circuit 26c. The operation of the second camera 26 is also controlled by the timing controller 24.

The environment recognition apparatus 10 according to the second embodiment of this invention is configured in the foregoing manner, it becomes possible to recognize, in addition to the shape or undulation of the object 12a, the distance to the object 12a accurately. Further, since the light pattern 16a is configured to be the texture light pattern like the first embodiment, in addition to the effect and advantage mentioned above, it becomes possible to associate the images even when the object 12a has no pattern and to enhance the recognition accuracy. The rest of the effects and configuration is the same as those of the first embodiment.

As mentioned above, the first and second embodiments are configured to have an environment recognition apparatus (10) including: a light projector (16) that intermittently projects a light pattern (16a) toward an object to be measured (12a) existing in an environmental space (12) in accordance with a duty factor (τ/T) of a pulse train defining one frame; a camera (20) that outputs a difference image between an image of the object taken at an exposure where the light pattern is projected and an image of the object taken at an exposure where the light pattern is not projected; and a recognition means (22) that recognizes the object based on the outputted difference image; characterized by: a timing controller (24) that controls a timing to project the light pattern by varying a pulse repetition period (T) in the pulse train in one frame at random.

Further, they are configured such that the light pattern 16a is a texture light pattern.

Further, they are configured such that the apparatus (10) is mounted on a moving object (legged mobile robot) 14 that is configured to be movable using moving means (legs) 14b.

Further, they are configured to have an environment recognition method including the steps of intermittently projecting a light pattern (16a) toward an object to be measured existing in an environmental space in accordance with a duty factor of a pulse train defining one frame (S100 to S108); obtaining a difference image between an image of the object taken at an exposure where the light pattern (16a) is projected and an image of the object taken at an exposure where the light pattern (16a) is not projected (S100 to S122); and recognizing the object based on the obtained difference image; characterized by the step of: controlling a timing to project the light pattern (16a) by varying a pulse repetition period (T) in the pulse train in one frame at random (S10 to S22, S100 to S108).

Further, they are configured such that the light pattern (16) is a texture light pattern.

It should be noted in the above that, although the environment recognition apparatus 10 is mounted on a legged mobile robot 14 as shown in FIG. 2, the invention should not be limited to it. The apparatus 10 may be mounted on a wheeled robot, a crawler robot, or an unmanned vehicle, etc.

Figure 11:
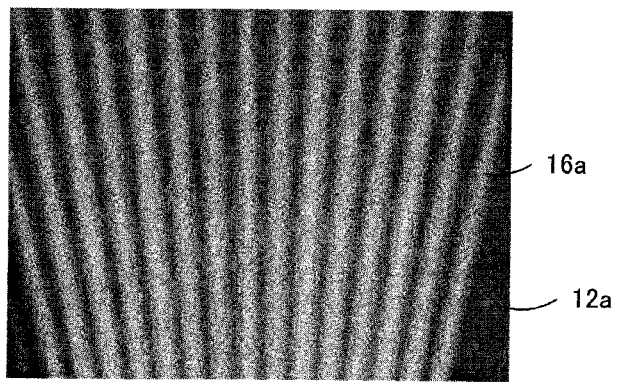
FIG. 11 is an explanatory view showing another example of the light pattern to be used in the first and second embodiments of this invention.

It should also be noted in the above that, although the light pattern 16a shown in FIG. 4 is used, it may be a multi-slit light as illustrated in FIG. 11.

It should further be noted that the light pattern 16a may be a texture light pattern with information on a direction of injection or a texture light pattern with information that identifies at least the apparatus. In that case, it becomes possible to avoid the interference with the other more surely. Further, the light need not be a visible light and may be ultraviolet light or infrared light.

It should further be noted that, although the light projector 16 is constituted as a laser scanner, it may be a combination of laser and hologram, or an array of numerous LEDs of narrowed projection angles, or a combination of integrated LEDs and lens.

INDUSTRIAL APPLICABILITY

The invention is configured to have a timing controller that controls a timing to project the light pattern by varying a pulse repetition period in the pulse train in one frame at random, by varying the projection timing of the light pattern at random, like the prior art, the pulse can be out of phase with that of the other apparatus, thereby enabling to avoid the interference therewith effectively. Further, since what is varied at random is the pulse repetition period, it becomes possible to prevent the pulse width from becoming small and the projection time from falling short and hence, the camera need not have a high sensitivity. In addition, since it is configured to obtain the difference image between the images taken at the exposure when the light pattern is projected and the exposure when the light pattern is not projected, it becomes possible, like the prior art, to reduce the influence of reflection on the object to be measured caused, for example, by the fact that an illuminating light is unintentionally taken in the image.

The invention claimed is:

1. An environment recognition apparatus, comprising:
 a light projector that intermittently projects a light pattern toward an object to be measured existing in an environmental space in accordance with a duty factor of a pulse train defining one frame;
 a camera that outputs a difference image between an image of the object taken at an exposure where the light pattern is projected and an image of the object taken at an exposure where the light pattern is not projected;
 a recognition means that recognizes the object based on the outputted difference image; and
 a timing controller that controls a timing to project the light pattern by varying a pulse repetition period in the pulse train in one frame at random,
 wherein each pulse repetition period is calculated by generating a random number, multiplying the generated random number by a time value corresponding to a pulse width, and adding a predetermined time value corresponding to a minimum pulse width to the product of the generated random number and the time value corresponding to the pulse width.

2. The apparatus according to claim 1, wherein the light pattern is a texture light pattern.

3. The apparatus according to claim 1, wherein the apparatus is mounted on a moving object that is configured to be movable using moving means.

4. The apparatus according to claim 1, further including:
 a second camera that outputs a difference image between an image of the object taken at an exposure where the light pattern is projected and an image of the object taken at an exposure where the light pattern is not projected.

5. The apparatus according to claim 1, wherein the frame is a fixed time period, and the outputted difference image is a summation of the images of the object taken over the frame.

6. An environment recognition method, comprising the steps of:
 intermittently projecting a light pattern toward an object to be measured existing in an environmental space in accordance with a duty factor of a pulse train defining one frame;
 obtaining a difference image between an image of the object taken at an exposure where the light pattern is projected and an image of the object taken at an exposure where the light pattern is not projected; and
 recognizing the object based on the obtained difference image; and
 controlling a timing to project the light pattern by varying a pulse repetition period in the pulse train in one frame at random
 wherein each pulse repetition period is calculated by generating a random number, multiplying the generated random number by a time value corresponding to a pulse width, and adding a predetermined time value corresponding to a minimum pulse width to the product of the generated random number and the time value corresponding to the pulse width.

7. The method according to claim 6, wherein the light pattern is a texture light pattern.

8. The method according to claim 6, wherein the frame is a fixed time period, and the outputted difference image is a summation of the images of the object taken over the frame.

* * * * *